United States Patent [19]

Sansome

[11] Patent Number: 5,677,663
[45] Date of Patent: Oct. 14, 1997

[54] SECURITY ENABLING AND SWITCHING DEVICES

[75] Inventor: Andrew Jonathan Thomas Sansome, Owslebury, England

[73] Assignee: British Technology Group Limited, London, England

[21] Appl. No.: 356,313

[22] PCT Filed: Jun. 17, 1993

[86] PCT No.: PCT/GB93/01284

§ 371 Date: Dec. 15, 1994

§ 102(e) Date: Dec. 15, 1994

[87] PCT Pub. No.: WO93/25414

PCT Pub. Date: Dec. 23, 1993

[30] Foreign Application Priority Data

Jun. 18, 1992 [GB] United Kingdom ............. 9212910

[51] Int. Cl.⁶ .............................................. B60R 25/10
[52] U.S. Cl. .................... 340/426; 340/425.5; 340/428; 307/10.2; 307/10.3; 307/10.4; 307/10.5; 180/287
[58] Field of Search ............................. 340/425.5, 426; 307/10.2, 10.3, 10.4, 10.6; 180/287

[56] References Cited

U.S. PATENT DOCUMENTS

| 3,953,831 | 4/1976 | Estrada ............................... 340/575 |
| 4,050,063 | 9/1977 | Schull . |
| 4,288,778 | 9/1981 | Zucker . |
| 4,463,340 | 7/1984 | Adkins et al. . |
| 5,079,436 | 1/1992 | Elkins ................................. 307/103 |
| 5,258,741 | 11/1993 | Fuller ................................. 340/426 |
| 5,404,129 | 4/1995 | Novak et al. ...................... 340/428 |
| 5,469,151 | 11/1995 | Lavelle et al. ................. 340/825.36 |

FOREIGN PATENT DOCUMENTS

| 5804790 | 1/1991 | Australia . |
| 2503266 | 8/1975 | Germany . |
| 1487276 | 9/1977 | United Kingdom . |
| 2170633 | 8/1986 | United Kingdom . |
| 8103002 | 10/1981 | WIPO . |

*Primary Examiner*—Jeffery Hofsass
*Assistant Examiner*—Daryl C. Pope
*Attorney, Agent, or Firm*—Cushman, Darby & Cushman IP Group of Pillsbury Madison & Sutro LLP

[57] ABSTRACT

A removable security device for a vehicle is provided, having at least one portion adapted to be inserted into a cigar/cigarette lighter of the vehicle. A terminal receives power produced by an external power supply, and a signal modifier modifies a characteristic of the power produced by the external power supply to produce a verification signal. A reader detects a presence of the verification signal, and an enabler enables the vehicle to be driven when the presence of the verification signal is detected.

23 Claims, 7 Drawing Sheets

SECURITY ENABLING AND SWITCHING DEVICES

1. Field of the Invention

This invention relates in general to security enabling and switching devices for a vehicle having an electrical power supply system. The invention also relates to the enabling and switching devices when used in combination, to a vehicle when fitted with such devices, and to a vehicle component incorporating the switching device. The invention relates more particularly to security devices of the "immobilization" type where the enabling device is an electronic "key" bearing an authorization code and the switching device switches on a vital component of the vehicle (say, the fuel pump (or fuel injection system) or starter motor solenoid) only when activated by a key bearing the correct authorization code.

2. Background of the Invention

It is already known from Australian Patent Application No. 58047/90 to provide a security device to prevent unauthorized usage of a vehicle. The security device comprises an electronic key in which is stored an authorization code, a decoder for receiving the code upon electronic connection of the Key, and an electronic switch to enable operation of a component of the vehicle when the key supplies a valid code to the decoder. Dedicated wiring is provided to transmit the decoded signal from the decoder to the switch when the key is directly electrically connected to the decoder.

This arrangement suffers from several disadvantages associated with the use of this dedicated wiring link. Most importantly, a thief can determine the location of the switch by tracing the wiring from the decoder to the switch. Once located, the switch can be overridden and the vehicle can be stolen. Also, fitting of the wiring can be time-consuming and expensive.

Another vehicle disabling device is described in U.S. Pat. No. 4,463,340 (ADKINS). This device has a permanently connected keyboard. Data from the Keyboard is transmitted to a receiver or switch, using a pulse width modulation (PWM) technique. This system of data transmission was found to be acceptable for words having a low number of bits in their length. However, as word lengths became longer, in order to enhance security, because clock rates at the key (encoder) and receiver (decoder) may differ synchronization can become difficult. This could lead to corruption of data and/or non recognition, by the decoder, of a valid authorization signal.

International Patent Application WO-A-8103002 (BLAIS AUTOSECURITY CORP) describes a coded engine starter system. A modulated carrier signal transmits data to a decoder which decodes the signal and permits a starter motor to be started if the signal is bona fide.

German Patent DE-A-2 503 266 (SVENSKA) teaches a vehicle specific signal source/code generator which imposes its code only on the ignition circuit, and specifically isolates this from the rest of the vehicle's power supply by the use of a filter.

U.S. Pat. No. 4,288,778 (ZUCKER) describes a removable digital encoder which mates with a dedicated socket mounted in an accessible location on the vehicle. The socket has a connection to carry data from the encoder to decoder.

Finally U.S. Pat. No. 4,050,063 (SCHULL) describes a vehicle security system having a mechanical-electronic key which is inserted into a lock system. Upon sequential mechanical and electronic unlocking the security system is immobilized and the vehicle may be driven.

Some of the arrangements described above suffer from the same disadvantages as the device described in the above mentioned Australian Patent Application. Others are complex and/or expensive and may be relatively easily wired around or bypassed.

SUMMARY OF THE INVENTION

According to the present invention there is provided a removable security device for a vehicle, the device having means for receiving a power supply and means for modifying a characteristic of the supply so as to impart an identification signal to said power supply, a characteristic of which signal is received and read to verify a user's authority and which on verification enables the vehicle to be driven.

Preferably verification is carried out by a decoder which is fitted to a receiver or switch. This receiver or switch then permits at least one vital component of the vehicle to be activated or energized and thereby permits the vehicle to be driven.

There is also provided a security switching device for a vehicle having an electrical supply system, comprising a switch arrangement for selectively providing electricity from the supply system to a vehicle component, means for receiving a security signal superimposed on the supply system and means for actuating the switch arrangement in dependence on whether the security signal is valid.

An advantage with the aforementioned invention is that it does not require any modification of a vehicle in order to use the device, also referred to as a key; and only minor modification to fit one or more receivers, also called switching devices, to various actuators, pumps; motors etc. or other so called vital vehicle components in a vehicle to be driven.

By providing the link between the enabling device (key) and the switching device or receiver via superimposition of the security signal on the vehicle's existing electrical supply system, rather than through a dedicated wiring link, several advantages can be achieved. Firstly, the switching device can be difficult or practically impossible to locate, since the potential thief may have no way of tracing its location. Secondly, fitting of the enabling and switching devices can be very simple, since no dedicated wiring link between them is necessary. Indeed, several switching devices can be fitted into different circuits without any increase in wiring complexity. Thirdly, since no dedicated wiring link is necessary and the security signal can be transmitted to every active circuit in the vehicle via the existing electrical supply system, there are virtually no restrictions on where the switching device or devices may be fitted.

Although the enabling device (key) may be a concealed switch or the like, for added security it is preferred that at least part of the enabling device is removable from the vehicle. This part would be utilized by the user as a "key", and preferably has an authorization code stored in electronic form within it.

In fact, the enabling device could be formed in two distinct parts, namely a "key" part which could transmit (for example by radio, electric impluse or infra-red telemetry) the authorization code, and a receiver part which could receive that code and superimpose it as a security signal on the vehicle's electrical supply system. However, it Is possible that potential thieves would be able to read electronically the authorization code as it is being transmitted. Therefore, it is preferred that the enabling device (key) further includes connector means for releasably connecting the device directly to the power supply system. This can provide a relatively simple and secure arrangement. In the preferred embodiment, the enabling device is adapted to plug into the vehicle cigar or cigarette lighter socket. No modification of the vehicle is then necessary to accommodate the enabling device.

According to another aspect of the present invention, there is provided a security enabling device for a vehicle having an electrical power supply system, comprising means for selectively superimposing a security signal on the power supply system, characterised in that the device is adapted to be inserted into a cigar/cigaretter lighter socket.

Preferably, the security signal takes the form of a carrier signal which Is frequency modulated by an authorization code in order to enhance signal/noise ratio. However, the authorization code could alternatively be superimposed directly on the supply system.

Considering now the switching device in more detail, this may conveniently be arranged to switch the starter motor solenoid or the fuel pump, or both, or indeed any other electrical circuit or circuits. If the device is fitted on the vehicle from new, it could be fitted within the housing of the relevant component. Or this could be effected at the point of manufacture of the fuel pump, starter motor, servo system, headlamp, ignition system or any other electrical component used in a private or commercial vehicle. If the device is "retro-fitted", then it would usually be placed some distance away from the relevant component, to hinder location of the device by a potential thief.

For added security, it is preferred that the switching device further comprises means for refusing further security signals if an invalid security signal is received. This can prevent a potential thief using an automatic scanner to scan quickly through all possible authorisation codes.

Again for added security, if the security signal is repetitive, it is preferred that the refusing means is arranged to refuse further security signals if a predetermined plurality of invalid security signals are detected. This removes the problems which might be encountered if a potential thief is operating equipment designed to circumvent the security system. Alternatively or additionally, the refusing means may be arranged to refuse further security signals if a valid security signal is not received within a predetermined interval from when power is first supplied to the device. (It is appreciated that the term "power" in this context, means the supply of electrical current from the vehicle's electrical supply). This can prevent a potential thief from scanning for the correct authorization code. Dummy devices may also be fitted to various actuating devices.

If the vehicle has an operating switch, such as an ignition switch, preferably the switching device is arranged to operate only when the operating switch is switched on. This can provide added security. In particular, it can prevent a potential thief scanning possible authorization codes, unless the thief also has the vehicle operating switch key.

Preferably, the switching device or enabler further comprises means for latching the switch arrangement once actuated by a valid security signal. This could, for example, prevent inadvertent (and possibly dangerous) stalling of the vehicle in the event that the user were to disconnect his security key. The latching means may conveniently be arranged to maintain the switch arrangement latched even when power is removed from the switching device. This can facilitate the switching of intermittent loads. In addition energy storage means, such as for example a battery or a capacitive device, may be arranged via suitable switching arrays, such as transistors and FETS, to ensure that a device is held in a latched state in the event of a voltage fluctuation.

A constant current source may be employed to source current to the Zener diode in the voltage regulator in the key. This may comprise a constant current source similar to that used in the switching device or simply a resistor in series.

Preferably, the switching device has only two external electrical terminals. By providing a "two-pin" rather than a "three-pin" device, fitting of the device to the vehicle can be greatly facilitated. One terminal can be fitted directly to the relevant component, whilst the other can be fitted directly to the supply line. Similarly the device may be fitted between the load and ground. Thus no extra wiring need be used.

The switching device has a high input impedance to prevent attenuation of the security signal. This may be particularly important if the device is of the two-pin type and if further (as would often be the case) the load is inductive and has a high impedance at the carrier frequency.

The invention extends to the security enabling and switching devices as aforesaid, possibly in kit-of-parts form.

For added security, a plurality of security switching devices may be provided. This can greatly reduce the chance of the security system being successfully overridden.

The enabling device includes a clock for timing encoding of the security signal and the switching device includes a clock for timing the decoding of the signal. Means is preferably provided to synchronize the two clocks. This can afford both ease of manufacture and reliability. In addition, as stated above, this enhances the reliability of the switching device and the enabling device when security codes of long word length are used. Typically words may comprise 20 bits. In the absence of any synchronizing means, mismatch due to temperature or voltage changes, or variation in component tolerances/ageing, could cause malfunction. Preferably each clock rate Is tied to the carrier signal frequency.

The invention also extends to a vehicle when fitted with any of the security devices as aforesaid and similarly it extends to a component fitted with a switching device.

A further advantage of the key compared to permanently connected interface is that the key of the present invention draws current from the car battery, thereby producing a voltage drop which may be sensed elsewhere in the vehicle. While such an arrangement may be satisfactory if the interface means is permanently affixed to the vehicle, the current drawn (and hence power dissipated) is prohibitive if it is wished to remove the interface or key.

Other advantages of the present invention are:

a) The output waveform is sinusoidal thereby avoiding wide band radio frequency radiation which could conflict with legal restrictions (which may prevent commercial use of the system);

b) The interface sources current onto the vehicle's electrical supply as well as drawing current from it; and c) Power dissipation in the key or enabler is reduced to a sufficiently low level to make a removable interface/encoder possible and to avoid the need for a heat sink.

BRIEF DESCRIPTION OF THE DRAWINGS

Preferred features of the invention will now be described, by way of example only, and with reference to the accompanying drawings, in which.

DETAILED DESCRIPTION OF THE ILLUSTRATED EMBODIMENTS

Figure 1:
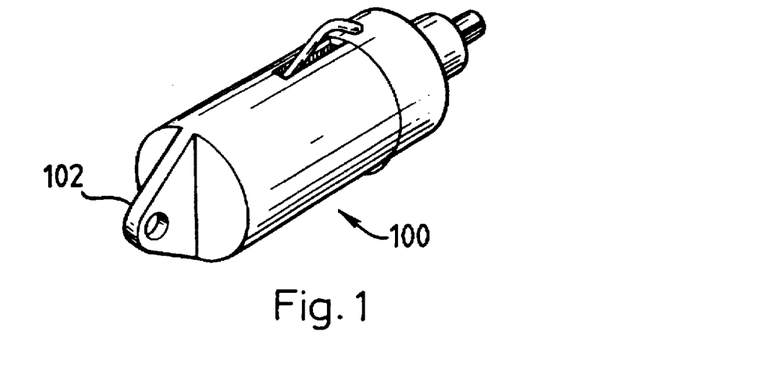
FIG. 1 is a perspective view of a security enabling device according to the present invention.

Referring to FIG. 1, a security enabling device 100 takes the form of an electronic "key" which is capable of plugging into a vehicle's existing cigarette lighter socket (not shown). Externally, the key is of conventional shape, except that it is provided with a flat extended portion 102 having a hole for enabling the key to be fitted onto a key-ring. The key houses electronic circuitry, as will be described later. A light emitting diode (LED) and/or audible alarm may be incorporated into the Key so as to illuminate and/or bleep when in use or when first switched on and/or off, for example to remind the user to remove the key.

Figure 2:
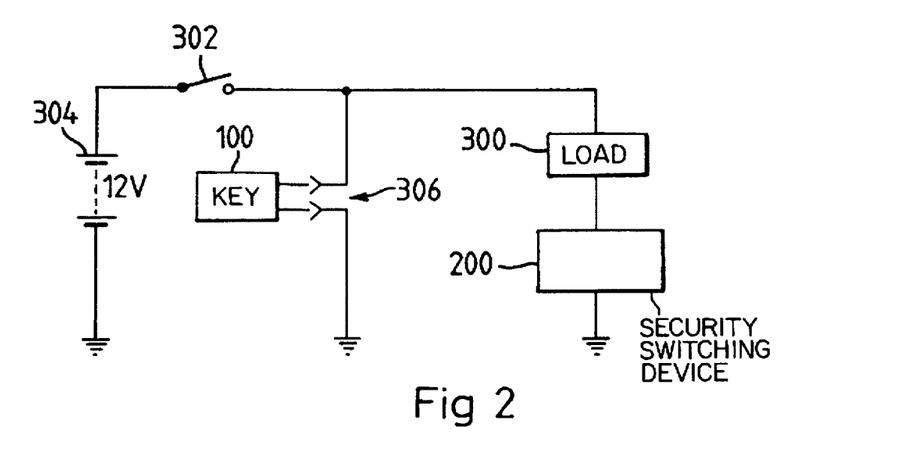
FIG. 2 is a block diagram showing the overall structure of an enabling device key and a security switching device (receiver)

Referring to FIG. 2, the key 100 is incorporated in a security system for a vehicle which also includes a security switching device 200 for switching a load 300 which would usually be a vital component such as a starter motor solenoid of a vehicle. Both the key 100 and switching device 200 receive current via vehicle ignition switch 302 from a battery 304. The key 100 is plugged into the vehicle via the cigarette lighter socket 306.

In operation, unless the key 100 is inserted into the cigarette lighter socket 306 the switching device 200 maintains the load 300 switched off even if the ignition switch 302 is switched on. Thus, if the load is for example a starter motor solenoid or fuel pump, the vehicle will be effectively immobilized unless the key 100 is inserted, since the device 200 will not have received an authorization signal from the key. A secure authorization code is stored on the key. Once the key 100 is inserted into the lighter socket 306, it superimposes on the vehicle power supply system a security signal related to the authorization code. This signal is received by the switching device via the power supply system and assessed as to its validity. If the signal is valid, the switching device 200 switches current to the load 300 so that the vehicle can operate. In the preferred embodiment, the security signal is a repeating 20 bit word, so that over one million ($10^6$) authorization code combinations are possible.

Figure 3:
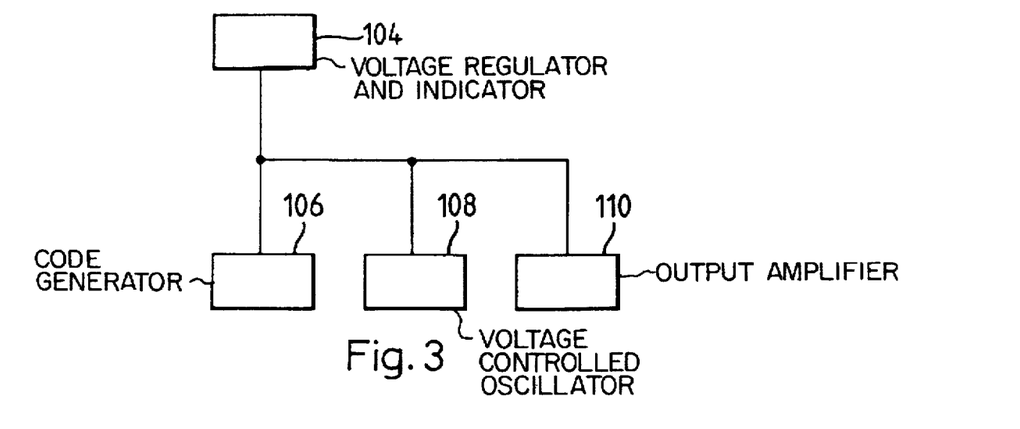
FIG. 3 is a more detailed block diagram of the enabling device.

Referring now to FIG. 3, the key 100 comprises in general terms a voltage regulator and indicator 104, a code generator 106, a voltage controlled oscillator 108 and an output amplifier 110. The code generator 106 serves to produce the authorization code, whilst the voltage controlled oscillator 108 serves to produce an oscillating carrier signal frequency modulated by the authorization code. Each of the components mentioned above is now described in more detail with reference to FIG. 4.

Figures 4, 5:
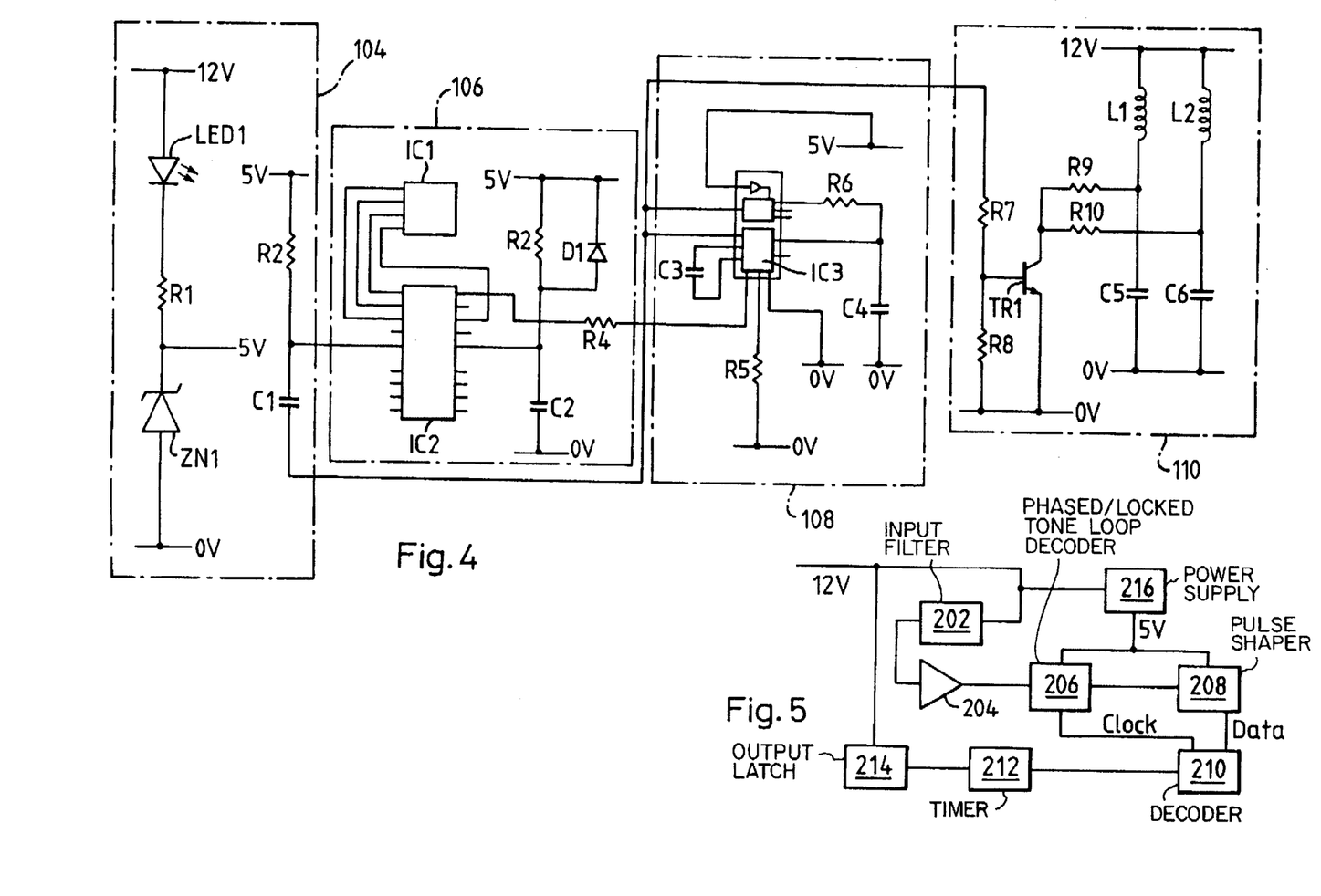
FIG. 4 is a circuit diagram of the enabling device.
FIG. 5 is a more detailed block diagram of the switching device.

The current source supplying Zener diode ZN1 could be a resistor (as shown) or a constant current source similar to that used in the switching device.

(a) Voltage regulator and indicator (104)

Light emitting diode LED1 is connected from +12 V (from the vehicle battery) to resistor R1 which is in turn connected to the cathode of zener diode ZN1, the anode going to 0 volts. A.C. decoupling is provided by capacitor C1, the whole forming a shunt regulator.

Current flows from 12 V via LED1 and R1 to ZN1. ZN1 provides the voltage regulation. In the process LED1 is illuminated, indicating that the circuit is energized. This illumination appears as a light visible on the housing of the key 100.

(b) Code generator (or encoder) (106)

Integrated circuit IC1 is a serial EEPROM containing the authorisation code and operating mode data. It is connected to code generator IC2. IC2 is connected to 5 V via resistor R2 and to the voltage controlled oscillator (VCO) 108 via Capacitor C1. Its reset pin is also connected to 5 V via resistor R3 and diode D1, and to 0 V via capacitor C2. Its output pin is connected to integrated circuit IC3 via resistor R4. Resistor R3, Capacitor C2 and diode D1 provide electrical power on reset to IC2.

The output of the voltage controlled oscillator 108 is used as a clock for the code generator IC2, and is transmitted via capacitor C1 to the clock input pin (5). Thus the time base for the serial data is tied to the output carrier frequency and thence eventually to a corresponding decoder clock on the security switching device, in order to avoid temperature, supply voltage, or ageing mediated frequency mismatch between encoder and decoder.

The code generator 106 produces a 20 bit pulse width modulated (PWM) data stream, which is connected to the offset pin (12) of the voltage controlled oscillator 108 via R4.

(c) Voltage controlled oscillator (108)

IC3, a phase locked loop (PLL) IC, used to perform a voltage controlled oscillator function. The frequency of oscillation is determined by capacitor C3 and the current flowing through resistors R4 and R5, and in this embodiment is set at 100 kHz. It will be understood that other frequencies may be chosen, the choice depending partly on legal requirements. Resistor R6 and capacitor C4 maintain the correct operating conditions for the voltage controlled oscillator (VCO). Since the voltage applied to R4 is either 5 V or 0 V according to the data instantaneously present, the oscillation frequency varies with the data. In this embodiment, the variation is ±5 kHz.

(d) Output amplifier (110)

The output amplifier 110 consists of transistor TR1, resistors R7, R8, R9 and R10, inductors L1 and L2, and capacitors C5 and C6.

The key 100 superimposes data on the 12 volt power supply system of the vehicle by alternately drawing current from the battery 304 and then returning it, at the frequency of the voltage controlled oscillator. Since the battery and its immediately associated wiring has a finite resistance, the current drawn results in a small voltage being superimposed on the supply.

The square wave output of the voltage controlled oscillator 108 passes via R7 to TR1 and R8. TR1 thus turns on and off, and sinks collector current via R9 and R10 at the oscillation frequency. L1/C5 and L2/C6 form series resonant circuits having centre frequencies typically at 105 kHz and 95 kHz respectively. With a supply voltage of 12 volts each carries a resonant current of ±150 mA, which typically corresponds to a voltage variation of ±10 to ±20 mV superimposed on the supply voltage. The peak current drawn from and returned to the battery 304 with each cycle is therefore 300 mA, whilst the power dissipation in TR1 is minimal (of the order of a few mW only). One effect of the use of series resonant circuits is that the output waveform approximates to a sine wave.

Referring now to FIG. 5, the switching device 200 comprises in general terms an input filter 202, an input amplifier 204, a phase locked loop tone decoder 206, a pulse shaper 208, a decoder 210, a timer 212, an output latch 214, and a power supply 216. The output latch 214 functions in part as a switch arrangement to provide power from the power supply system to the load 300 (vehicle component); the decoder 210 functions in broad terms to actuate the switch arrangement in dependence on whether the security signal is valid, and most of the remaining components perform the function of receiving (and processing) the security signal from the vehicle power supply system. Each of the components mentioned above is now described in more detail with reference to FIG. 6A, which shows one embodiment of the arrangement.

Figure 6A:
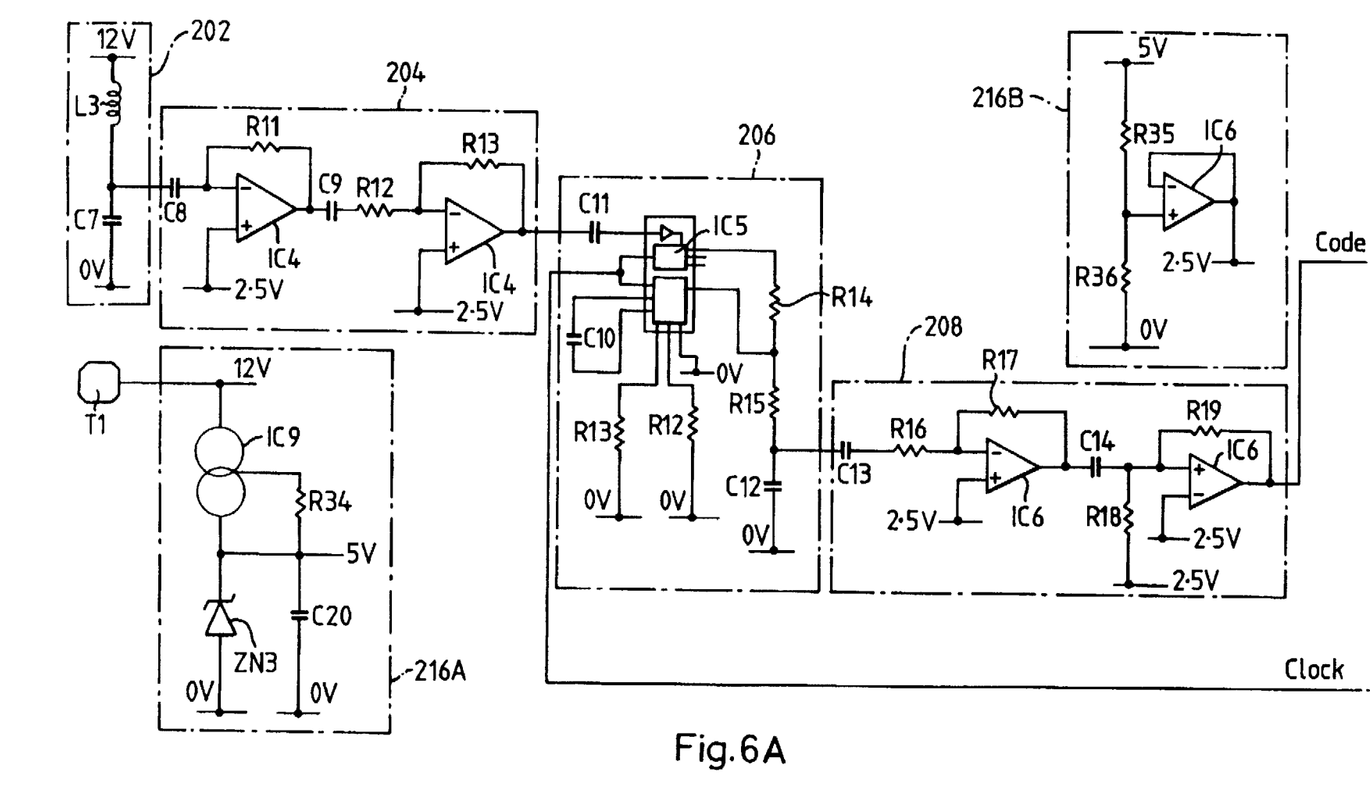
FIG. 6A is a circuit diagram of the switching device.
Figure 6A:
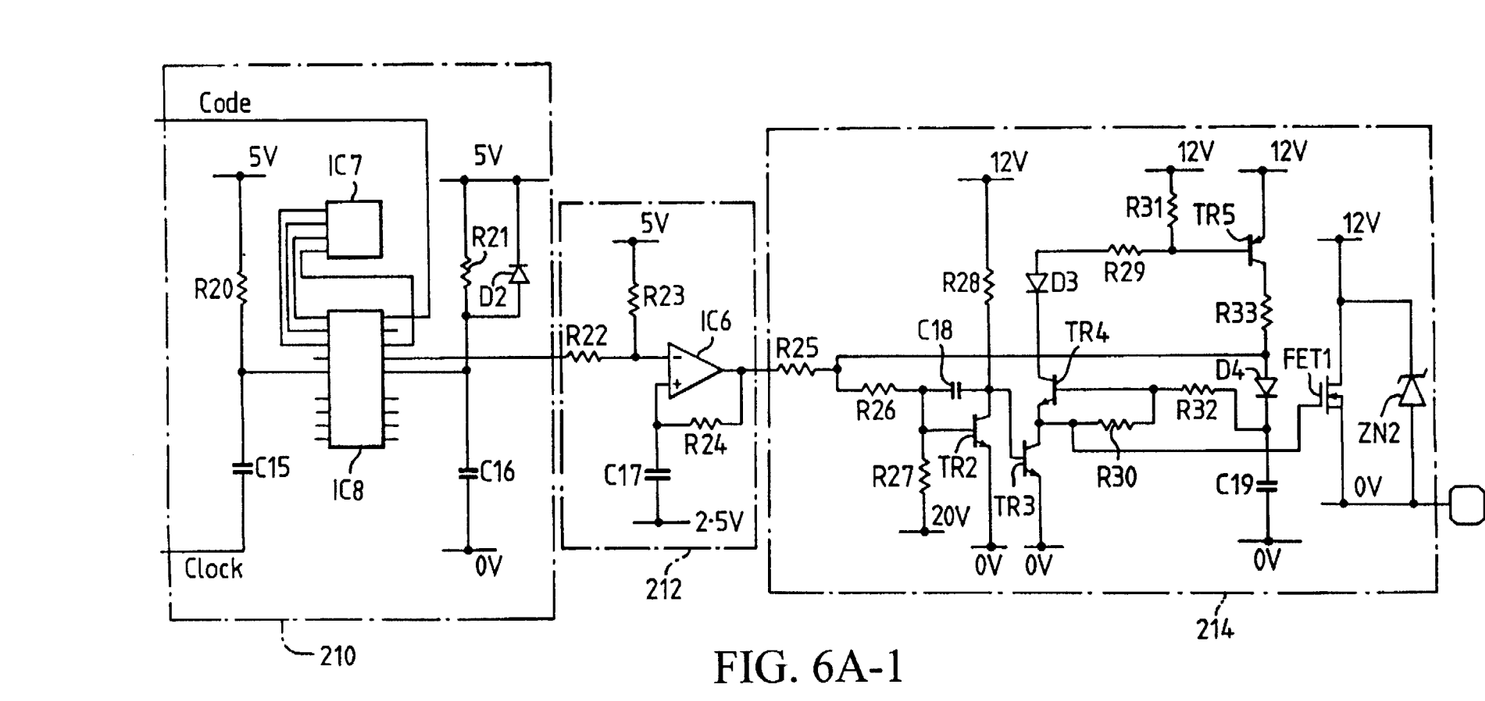
FIGS. 6B and 6C show circuit diagrams for the alternative switching drives.

(a) Input filter (202)

The input filter 202 consists of capacitor C7 and inductor L1 connected in series.

The security signal is received as an authorization code modulated on a 100 KHz carrier superimposed on the vehicle's 12 volt supply system. Capacitor C7 and inductor L3 form a series resonant circuit at the carrier frequency, enhancing the sensitivity of the receiver at this frequency and minimizing it at others.

(b) Input amplifier (204)

The input amplifier 204 consists of two operational amplifiers in integrated circuit IC4, capacitor C8 and resistor R11 associated with the first operational amplifier, and capacitor C9 and resistors R12 and R13 associated with the second operational amplifier IC4.

The security signal is coupled by C8 from the input filter 202 to the inverting input of the first operational amplifier IC4, and the amplified output is capacitively coupled by C9 to the second amplifier formed by R12, R13 and the second operational amplifier IC4. The gain of the combination is such that under normal operating conditions the output clips to supply rails.

It will be appreciated that the function of the input filter 202 could be carried out by the input amplifier 204, by configuring IC4 to act as a band pass filter.

(c) Phase locked loop tone decoder (206)

The phase locked loop tone decoder 206 consists of capacitors C10, C11 and C12, resistors R12 to R15, and integrated circuit IC6.

IC6 is a phase locked loop and carrier demodulator. In the absence of the security signal it "free runs" at a frequency determined by R12, R13 and C10 of approximately 100 kHz. The output signal from the input amplifier 204 is coupled by C11 to an input buffer, and then compared with the local voltage controlled oscillator in an exclusive OR phase comparator. The result of the comparison passes to a low pass filter formed from R14, R15 and capacitor C12, and controls the oscillation frequency of the voltage controlled oscillator. The voltage controlled oscillator is thereby tied to the security signal carrier frequency, and follows the variations in it which represent the superimposed data (that is, the authorization code). This allows the data to be recovered (the carrier demodulated) by the low pass filter. The demodulated data is presented to the pulse shaper 208 at the junction of R15 and C12.

(d) Pulse shaper (208)

The pulse shaper 208 consists of capacitors C13 and C14, resistors R16, R17, R18 and R19, and two operational amplifiers in integrated circuit IC6.

The input data to the pulse shaper consists of a repeated pulse width modulated data stream, the words being separated by a pause during which the output of the phase locked loop is not clearly defined. Data corruption may occur at the start of a word as a result. The input data is coupled by capacitor C13 to an inverting amplifier formed by R16 and R17 and an operational amplifier, (part of IC6). In order to define the state of the data stream between words the data is differentiated by C14 and R18 to extract the signal transitions. The differentiated signal is then reconstituted by the second operational amplifier and R18 and R19 which form a Schmitt trigger, the output of which only changes state when the differentiated data crosses its thresholds. The original data is thus regenerated, but the output remains "low" during the pause between words.

(e) Decoder (210)

The decoder 210 consists of capacitors C15 and C16, resistors R20 and R21, diode D2, and integrated circuits IC7 and IC8.

As in the code generator (encoder) 106, "power on reset" is provided, in this circuit by R21, C16 and D2. The authorization code is contained in IC7 (Serial EEPROM), whence it is read by the decoder proper (IC8). The decoder clock is derived from the phase locked loop voltage controlled oscillator (which is synchronized with the encoder clock in the key 100) via C15 and R20. The data from the pulse shaper is passed to the input of IC8 where it is compared with the authorization code read from IC7. If the two correspond then the comparison is repeated for the following word. If both are correct then the decoder output changes state (from 5 V to 0 V). If both are the same but incorrect then the device assumes attempted unauthorized use and refuses all further codes for 2 seconds. This refusal function is carried out in IC8 and is additional to the refusal function carried out in the timer 212.

(f) Timer (212)

The timer 212 consists of an operational amplifier which is one quarter of IC6, resistors R22 to R24, and capacitor C17.

Before a pair of valid codes has been received the output of the decoder 210 will be 5 V. The inverting input (−) of the operational amplifier will therefore be at 5 V via R22 and R23, and therefore its output will be at 0 V. The non-inverting input (+) will start at 2.5 V (2 V5), but will discharge via R24 towards 0 V over five seconds, the time constant being defined by R24 and C17. If the decoder output goes to 0 V within five seconds, then the operational amplifier output will go high to 5 V, triggering the output latch 214. If, however, the voltage on the non-inverting input is close to 0 V then the output of the operational amplifier will remain at 0 V irrespective of the state of the decoder output.

Thus the user has five seconds from when electrical power is supplied to the security switching device 200 by switching on the ignition switch 302 to transmit a valid security signal to the switching device. If a valid signal is not transmitted in that time, the device refuses further security signals until power has been disconnected and re-supplied to it. In practice (if, say, the load were the fuel pump) a potential thief attempting to scan through possible authorization codes would have to turn the ignition switch 302 on and off many times before the correct authorization codes were found. This would usually be impractical.

It will be appreciated that the five second period could be set by EPROM or some other suitable timing device rather than capacitively.

(g) Output latch (214)

The output latch 214 consists of resistors R25 to R33, capacitors C18 and C19, diodes D3 and D4, transistors TR2 to TR5, Field Effect Transistor FET1, and zener diode ZN2.

The output latch has to fulfil several functions:

1) once triggered it must remain active when the key 100 is disconnected;
2) once triggered it must remain active for several seconds even after power has been removed (so that it can switch intermittent loads, and, if the vehicle is stalled, so that it can permit the vehicle to be promptly restarted (e.g. if the switching device is used to switch the vehicle fuel pump));
3) it must remain latched in the presence of a varying load current;
4) it must have a low power dissipation;
5) it must have a very low quiescent power consumption; and
6) it must be reverse and over voltage protected.

In order to minimize power dissipation an enhancement mode field effect transistor is used as the output element. This requires a gate source voltage of greater than 4 volts to ensure a low "ON" resistance, and this is supplied by C19, via R30 and R32.

When power is first applied from the power supply system by switching on the switch 302, the output of the timer 212 is at 0 V, TR2 is held off, and TR3 therefore receives base current via R28 and conducts. C19 is not charged; therefore TR4 is off, base current is not drawn from TR5, collector current does not flow in TR5, and thus TR4 remains off. The circuit remains in an off state, with C19 discharged; FET1 remains off and therefore current is not permitted to flow through the load 300 to any significant extent.

If the timer output goes to 5 V (i.e. on acceptance of a valid authorisation code via the security signal) then C19 charges through R25 and diode D4. When the voltage across C19 reaches about 1.5 V TR4 conducts, turning on TR5 and rapidly charging C19, until the voltage across C19 reaches 6 V, TR2 remains off and therefore the charging continues. When 6 V is reached TR2 conducts, turning off TR3, TR4 and TR5 and stopping the charging process. In turning TR3 off, the gate of FET1 is allowed to rise to the voltage on C19 and therefore it conducts, supplying power to the load and in the process reducing the voltage across the terminals of the switching device 200 to a few mV.

As the gate voltage of FET1 falls towards the gate source threshold voltage (which in the present embodiment takes several minutes), the drain source resistance and therefore voltage rises. When it reaches 600 mV TR3 conducts, forcing the FET hard off. The voltage across the circuit rises towards 12 V, but since the voltage on C19 exceeds the 1.5 V necessary to force TR4 into conduction, TR4 and TR5 conduct, recharging C19 quickly to 6 V.

Figure 7A:
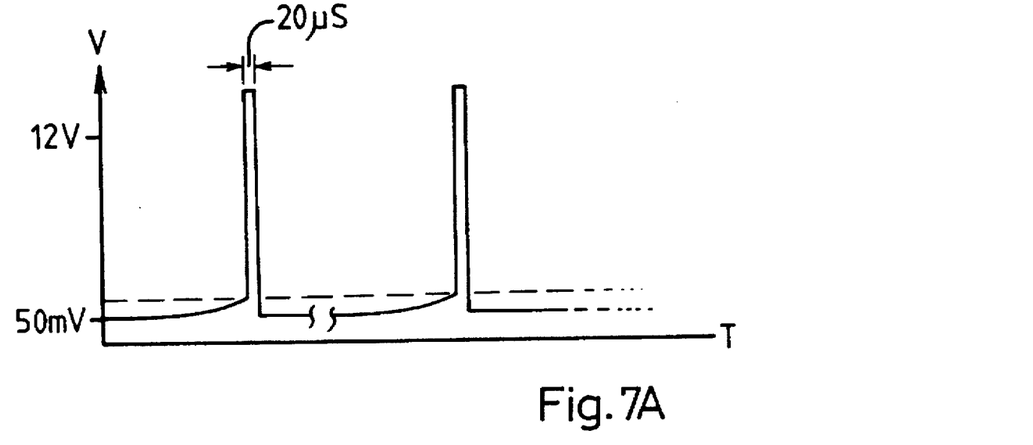
FIGS. 7A, B and C are sketches of output characteristics for the circuits shown in 6A, B and C respectively.
Figure 7B:
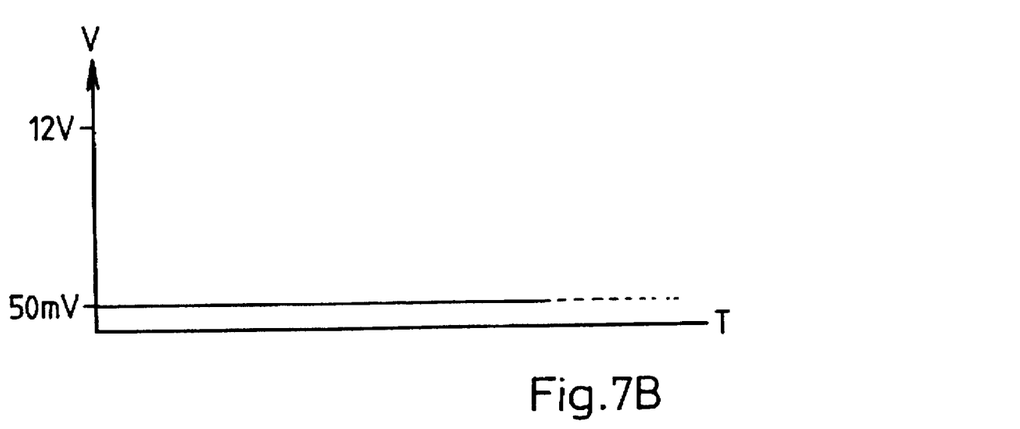
Figure 7C:
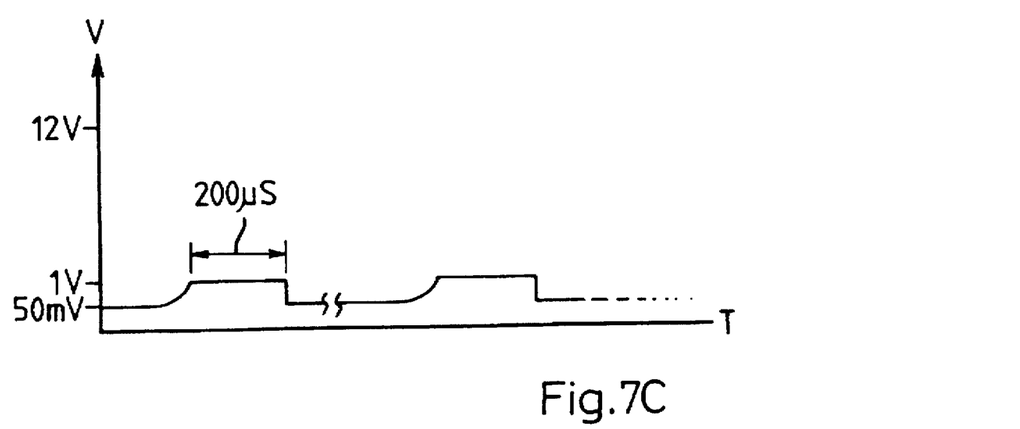

Thus every few minutes FET1 flips very briefly (for about 20 μs) into an off state while its reservoir capacitor (C19) is refreshed. The latch continues to conduct load current, but this flows into C19 rather than through FET1. A sketch of the output characteristics of output latch 214 is shown in FIG. 7A.

When the circuit is de-energized for longer than the time taken to discharge C19 below 1.5 V (this time being several minutes), it turns off until retriggered by the timer 212. The discharge current flows in leakage current through diodes D3 and transistors TR3 and TR4.

FET1 contains a reverse diode between drain and source, to protect against reverse voltage, while overvoltage spikes are clamped by Zener diode ZN2.

It will be appreciated that the field effect transistors could be replaced by, for example, a thyristor. However, FETs are preferable because they allow, in a simple fashion, the switching device 200 to be two terminal rather than three terminal; they dissipate less power (thereby avoiding heat sinking with a consequent increase in the size of the device); and they permit the device to switch intermittent loads (e.g. electric motors) easily. Another possibility is that the or each FET could be replaced by an Insulated Gate Bipolar Transistor.

(h) Power supply (216)

The power supply 216 comprises two units 216A and 216B. The output from 216A is 5 V from a constant current source IC9 and Zener diode ZN3. The input of 216B is fed with this 5 V and the op-amp (IC6) generates a supply voltage of 2.5 V which is fed to IC6 as shown at 208, and 212 and IC4 at 214.

The power supply 216 consists of integrated circuits IC9 and IC6, Zener diode ZN3, resistors R34A, R35A and R36A, and capacitor C20A.

The whole switching device 200 is a two terminal device, that is, it is placed in series with the load to be switched. Furthermore, the security signal is superimposed on the electrical supply supplied via these two terminals.

The power supply 216 presents a high impedance at the signal carrier frequency, while providing decoupling of the regulated supply. This is achieved by the use of a decoupled shunt regulator (formed by ZN3 and C20) supplied by a constant current source IC9 and resistor R34. The constant current source presents a very high impedance to the signal component of the 12 V supply.

R35 and R36 form a potential divider across the regulated supply, which is buffered by part of IC6 to supply the 2.5 V (2 V5) rail.

The rate of data transmission may be increased, in alternative embodiments of both the key and the switching device, by placing a divider: in the key between the output of the Voltage Controlled Oscillator (VCO) and resistor R7; and in the receiver (switching device) between the output of the VCO (in the PLL) and reference input of the PLL phase comparator. That is between pins 3 and 4 of IC5 as shown on FIG. 6A. This frequency divider arrangement allows the ratio of the encoder/decoder clock frequencies to the signal carrier frequency to be varied.

The two terminals of the switching device 200 are designated T1 and T2.

Figure 6B:
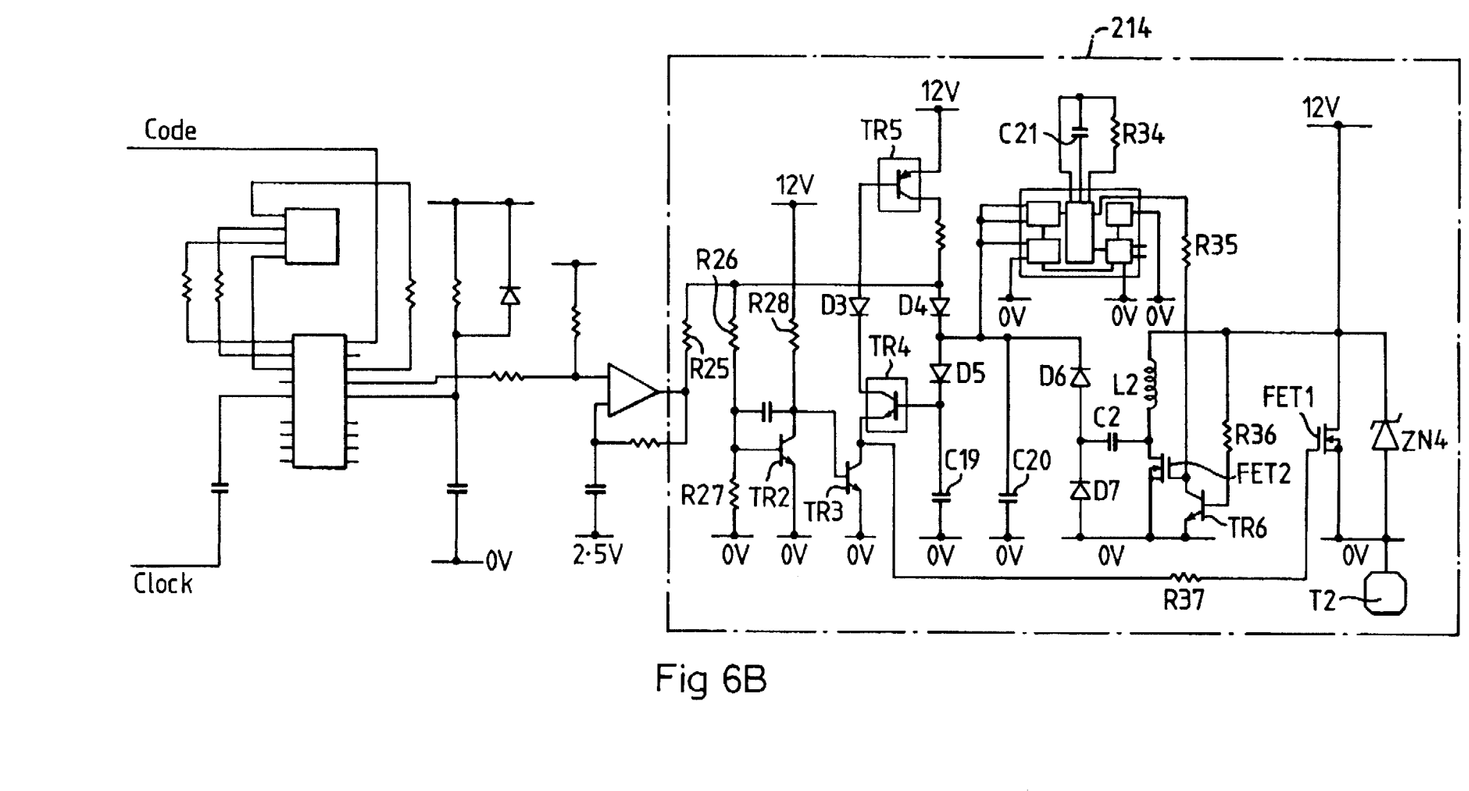
Figure 6C:
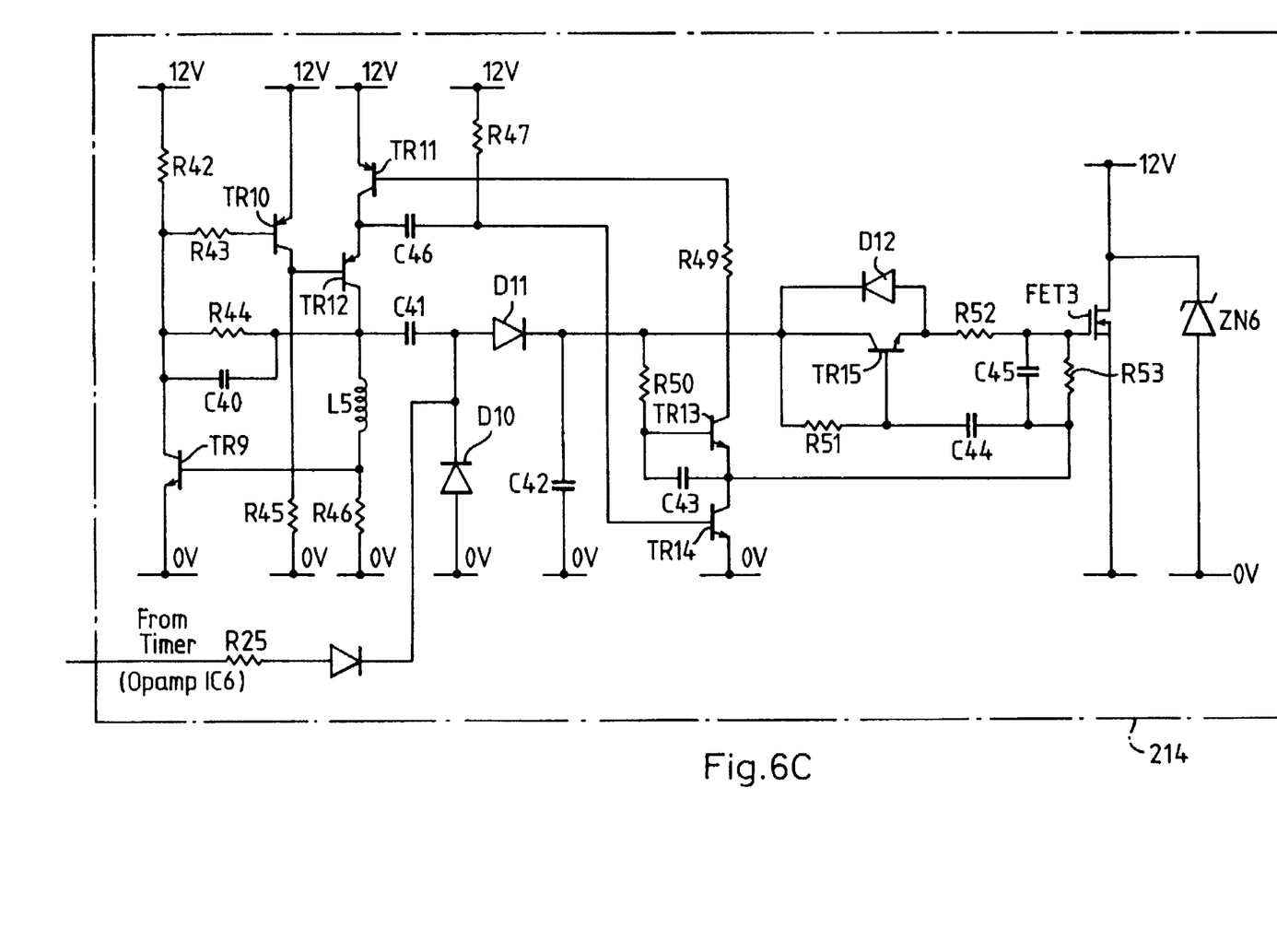

Both FIGS. 6B and 6C refer to alternative arrangements for the output latch 214 shown in FIG. 6A.

The circuit in FIG. 6A, uses an FET as the output device for the reasons discussed above. That configuration resulted in a latch which remained in a latched state for approximately 30 seconds and was then refreshed. The "latch" remained in an off state for a period of about 20 μs, as shown in graph 7A. That is when the output voltage exceeds the threshold shown by the dotted line in FIG. 7A. This output characteristic in the latch may have presented problems in certain jurisdictions as it could be considered dangerous for a power supply within a moving vehicle to be in an off state, albeit only for 20 microseconds, and then switched on again. The arrangements shown in FIGS. 6B and 6C and described below overcome this problem.

FIG. 6B shows a modified version of the arrangement of the latch 214 in FIG. 6A.

An additional integrated circuit IC 9 an ultralow power astable multivibrator forms a flyback generator which, when the switching device 200 is latched on, takes electrical power from across the field effect transistor FET 1.

The flyback generator consists of IC 9, D 5 to D7, C 20 to C 22, R 34 to R 36, L 2, TR 6 and FET 2. IC 9 is supplied with electrical power from C 20 and oscillates at a frequency determined by C 21 and R 34 (in this embodiment at 2 KHz). It supplies the gate of FET 2 with a square wave via R 35. When FET 1 is conducting, its drain source voltage is between 50 mV and 300 mV and this voltage Is available across FET 2 and its drain load, inductor L 2. The back EMF generated when FET 2 is turned off is sufficient to drive current through capacitor C 22 and D 6 onto C 20, and thence via D 5 onto C 19. Provided the voltage across FET 1 exceeds 50 mV the flyback generator charges C 19 and C 20 to greater than 4 volts, and thus holds FET 1 on via TR 4 (Built in base emitter resistors) and R 37. Since the energy stored in the inductor L 2 in each cycle exceeds the power required to drive the flyback generator the circuit is self sustaining, maintaining the voltage on C 19 and C 20.

If the output latch is off and switch 302 is on, then the voltage across FET 1 exceeds 600 mV, TR 6 conducts holding FET 2 OFF, maintaining the latch in an OFF state. Protection of inductor L 2 and field effect transistor FET 2 is also provided by this means. The latch is turned on when the timer 212 output rises to 5 V. Current flows via resistor R25 and diodes D4 and D5 to charge C19 and C20 and via R37 to the gate of FET 1.

If the current through the load (and thus through FET 1) rises, the voltage across the drain source of FET 1 will rise and since this is driving the flyback generator its output will increase, raising the voltage across C 19 and C 20 and therefore turning FET 1 harder on. The circuit therefore automatically adjusts to hold the voltage across FET 1 drain/source at approximately 50 to 100 mV for currents between 10 mA to 2 amps. Therefore electrical power is continuously applied to the load 300, and the output FET does not "refresh" but remains permanently ON.

If electrical power Is removed for short periods of less than 1 second, then when it is reapplied the voltage across C 20 will be sufficient to restart the oscillator, IC 9 and the system remains ON with the flyback generator running. If however electrical power is removed for several seconds then C 20 will have discharged and the oscillator will not restart. FET 1 will however remain ON if the voltage across C 19 exceeds about 3 V5. C 19 will gradually discharge (about 30 seconds) until the voltage across FET 1 drain/source exceeds 600 mV. At this point two things happen simultaneously. The first is that TR 6 turns on via resistor R 36. This has the effect of holding FET 2 in an off state in order to protect it. Secondly transistor TR 3 turns on via resistor R 28, and C 19 and C 20 charge via transistors TR 4 and TR 5 and diodes D 4 and D5. Capacitors C 19 and C 20 charge to approximately 7 volts at which point transistor TR 2 turns on and this has the effect of stopping the charging process by turning off transistor TR 3. FET 1 is then turned back on and as the voltage across the drain source of FET 1 falls below 600 mV, transistor TR 6 is once again turned off and the flyback generator restarts. The circuit is therefore back to operation in its normal ON state.

If TR 6 were not activated to protect FET 2 then it might be switched on when the voltage across inductor L 2 and FET 2 were about 12 V. This would result in excessive current flowing with the risk that at least one of the components would be damaged.

FIG. 6C is an alternative latch arrangement and consists of a relaxation oscillator/flyback generator which is enabled when the voltage across the output field effect transistor FET 3 exceeds 600 mV and recharges C 42 and the FET 3 gate, turning the latter back on.

R42 to R 46, TR 9 to TR 12, C 40 and inductor L 5 form a relaxation oscillator based on L 5 which will operate from voltages as low as 1 volt. The period of oscillation is dependant on the time taken for the current through inductor L 5 and resistor R 46 to rise to the level at which the voltage across the resistor is sufficient to turn on transistor TR 9, and thus TR 10. As a consequence TR 12 turns off, the inductor current falls to zero and the cycle repeats. The back EMF generated is sufficient to drive current through C 41 and D 11, charging C 42.

When the latch is in its ON state the gate of FET 3 is connected to C 42 via transistor TR 15 and resistors R 51 and R 52, as long as the voltage across FET 3 drain/source is less than 600 mV, transistor TR 14 remains off. As C42 discharges (over approximately 30 seconds) the drain/source voltage rises and when it exceeds 600 mV transistor TR14 turns on.

This has three effects, firstly the gate of FET 3 is slowly discharged via resistor R 53. Secondly, transistor TR 15 is held off for a period defined by resistor R 51 and capacitor C 44. Thirdly if the voltage across C 42 exceeds 800 mV transistor TR 13 conducts, turning on TR 11 and enabling the oscillator. Capacitor C 42 rapidly discharges via resistor R 50, TR 13 and TR 14, pulling the voltage on the field effect transistor FET 3 gate down via diode D 12 and resistor R 52. As the gate/source voltage falls the gate/drain voltage rises until about 1 volt is reached when the oscillator starts. C 42 is recharged, from the back EMF of inductor L5 via C41 and D11. FET 3 gate remains isolated for the duration of the C 44, R 51 time constant. Capacitor C 42 is therefore charged above the field effect FET 3 gate threshold, (to approximately 8 volts). During the charging cycle the voltage on C 42 exceeds that on the field effect gate, which therefore remains isolated, diode D 12 being reverse biased. The FET 3 drain/source voltage is therefore not allowed to exceed the start up voltage of the oscillator.

At the end of the C 44/R 51 time constant transistor TR 15 reconnects C 42 to FET 3 forcing it hard on. The cycle thus repeats itself and refreshes approximately every 30 seconds. However, unlike the latch arrangement (214) in FIG. 6A the FET 3 only switches off partially to a voltage of approximately 1 volt for a period of 200 microseconds every 30 seconds. Switching characteristics are shown in 7A, 7B and 7C in which these figures show the characteristics for the respective latch circuits 6A, 6B and 6C.

Components referred to above are now accorded typical values in the parts' list below. It will be appreciated that these values are given by way of example only and certain components may be substituted by others of different values. For example it may be desirous to vary a frequency of modulation or a time constant or Q value of a resonant circuit. Those skilled in the art will accordingly vary the components as required in accordance with the desired or required circuit characteristics.

| TYPICAL PARTS VALUE | | | |
|---|---|---|---|
| R1 = 390 R | R29 = 4 K7 | C7 = 3n3 | D8 = 1N4148 |
| R2 = 18 K | R30 = 4 K7 | C8 = 270 pF | D9 = 1N4148 |
| R3 = 100 K | R31 = 4 K7 | C9 = 330 pF | D10 = 1N4148 |
| R4 = 470 K | R32 = 4 K7 | C10 = 47 pF | IC1 = 93C06 |
| R5 = 22 K | R33 = 47 R | C11 = 1 nF | IC2 = 57C200 |
| R6 = 100 K | R34 = 3M3 | C12 = 10 nF | IC3 = 74HC4046 |
| R7 = 3K3 | R34A = 5R6 | C13 = 100 nF | IC4 = TL072 |
| R8 = 10 K | R35 = 4K7 | C14 = 1 nF | IC5 = 74HC4046 |
| R9 = 470 R | R35A = 100 K | C15 = 220 pF | IC6 = LM660 |
| R10 = 470 R | R36 = 100 K | C16 = 100 nF | IC7 = 93C06 |
| R11 = 150 K | R36A = 100 K | C17 = 470 nF | IC8 = 57C200 |
| R12 = 4K7 | R37 = 4K7 | C18 = 10 nF | IC9 = CD4047 |
| R12A = 22 K | R42 = 4K7 | C19 = 220 nF | IC9A = LM334 |
| R13 = 150 K | R43 = 4K7 | C20 = 220 nF | ZN1 = 5V1 |

-continued

TYPICAL PARTS VALUE

| | | | |
|---|---|---|---|
| R13A = 1 M | R44 = 100 K | C20A = 100 nF | ZN2 = 18 V |
| R14 = 47 K | R45 = 100 K | C21 = 47 pF | ZN3 = 5V1 |
| R15 = 2K2 | R46 = 39 R | C40 = 47 pF | ZN4 = 18 V |
| R16 = 10 K | R47 = 100 K | C41 = 2n2 | ZN5 = 18 V |
| R17 = 330 K | R49 = 470 R | C42 = 22 nF | L1 = 100 µH |
| R18 = 100 K | R50 = 100 K | C43 = 1 nF | L2 = 100 µH |
| R19 = 390 K | RS1 = 1 M | C44 = 560 pF | L3 = 1 mH |
| R20 = 18 K | R52 = 1 K | C45 = 330 pF | L4 = 470 pH |
| R21 = 100 K | R53 = 100 K | C46 = 100 pF | L5 = 470 pH |
| R22 = 100 K | C1 = 220 pF | D1 = 1N4148 | FET1 = IRFD16NO5 |
| R23 = 1 M | C2 = 100 nF | D2 = 1N4148 | FET2 = VN10KM |
| R24 = 10 M | C3 = 47 pF | D3 = 1N4148 | FET3 = IRFD16NO5 |
| R25 = 2K2 | C4 = 47 nF | D4 = 1N4148 | |
| R26 = 10 K | C5 = 27 nF | D5 = 1N4148 | |
| R27 = 1 K | C6 = 33 nF | D6 = 1N4148 | |
| R28 = 100 K | | D7 = 1N4148 | |

It will be understood that the present invention has been described above purely by way of example, and modifications of detail can be made within the scope of the invention. For instance, the security signal could be arranged to include distinct pre-amble and post-amble portions, and thus to provide more complex control of the switching devices. For example, different switching devices could be actuated in different ways.

Similarly, for example, variation may be made to the invention such that the device is incorporated into a conventional infrared car alarm and/or central locking system.

What is claimed:

1. A removable security device for a vehicle, comprising:
   an adapter adapted to be inserted into a vehicle's cigar/cigarette lighter socket, said adapter comprising:
   means for receiving an external power supply, and
   means for modifying a characteristic of the external power supply so as to impart an identification signal to said power supply allowing said identification signal to be received and read to enable the vehicle to be driven.

2. The device according to claim 1 further including connector means for releasably connecting the device directly to said external power supply.

3. The device according to claim 1 wherein said identification signal comprises a carrier signal frequency modulated by an authorization code.

4. The device according to claim 1, 2, or 3 including means for providing a perceptible signal depending on whether the device is connected to said external supply.

5. A security switching device for a vehicle having an electrical power supply system, said security switching device comprising:
   a vehicle cigar/cigarette lighter socket;
   a switch arrangement for selectively providing power from the power supply system to a vehicle component;
   means coupled to said vehicle cigar/cigarette lighter socket for receiving a security signal superimposed on said electrical power supply system; and
   means for actuating the switch arrangement to provide power from the power supply system to the vehicle component depending on whether the security signal is valid.

6. The device according to claim 5 further comprising means for refusing further security signals if an invalid security signal is received.

7. The device according to claim 6 wherein the security signal is repetitive and the refusing means is arranged to refuse further security signals if a plurality of repetitions of an invalid security signal is detected.

8. The device according to claim 6 or 7 wherein the refusing means is arranged to refuse further security signals if a valid security signal is not received within a predetermined interval from when power is first supplied to the device.

9. The device according to claim 7 further comprising means for latching the switch arrangement once actuated by a valid security signal.

10. The device according to claim 9 having only two external electrical terminals.

11. The combination according to claim 5 wherein said switch arrangement comprises a plurality of security switching devices.

12. A vehicle fitted with apparatus according to claim 9.

13. A vehicle when fitted with a device according to claim 9 wherein the device is arranged to operate only when a vehicle operation switch is switched on.

14. A vehicle component including a device according to claim 9 fitted within a housing.

15. A security switching device as in claim 5 further including a removable security enabling device adapted to be inserted into a cigar/cigarette lighter socket of said vehicle for receiving power from said electrical power supply system, said removable security device comprising:
   means for regulating said power from the electrical power supply system, and
   means for modifying a characteristic of said power so as to impart as said security signal an identification signal on said electrical power supply via said means for receiving a security signal,
   said characteristic being read by said means for actuating the switch arrangement to verify a user's authority and upon verification to enable the vehicle to be driven.

16. The vehicle according to claim 13, wherein said vehicle operation switch comprises an ignition switch.

17. The combination according to claim 4, wherein said switch arrangement comprises a plurality of security switching devices.

18. A combination comprising:
   a security switching device for a vehicle having an electrical power supply system, comprising:
   a switch arrangement for selectively providing power from the power supply system to a vehicle component,
   means for receiving a security signal superimposed on said electrical power supply system, and
   means for actuating the switch arrangement depending on whether the security signal is valid; and
   a removable security enabling device adapted to be inserted into a cigar/cigarette lighter socket of said vehicle for receiving power from said electrical power supply system, said removable security device comprising:
   means for regulating said power from the electrical power supply system, and
   means for modifying a characteristic of said power so as to impart as said security signal an identification signal on said electrical power supply via said means for receiving a security signal,
   said characteristic being read by said means for actuating the switch arrangement to verify a user's authority and upon verification to enable the vehicle to be driven;
   wherein said removable security enabling device comprises a first clock for timing encoding of said security signal and said security switching device includes a second clock for timing decoding of said security signal, said combination further comprising means for synchronizing said first and second clocks.

19. A removable security device for a vehicle, comprising:

at least one portion adapted to be inserted into a cigar/cigarette lighter receiving connector of a vehicle;

a terminal for receiving power produced by an external power supply;

a signal modifier for modifying a characteristic of said power produced by said external power supply to produce a verification signal;

a reader for detecting a presence of said verification signal; and an enabler for enabling said vehicle to be driven when the presence of said verification signal is detected by said reader.

20. The security device according to claim 19, wherein said characteristic comprises a voltage level output by said external power supply.

21. The security device according to claim 19, wherein said signal modifier comprises means for interfacing through said at least one portion to modify said characteristic of said power produced by said external power supply.

22. The security switching device according to claim 5, further comprising a removable security device adapted to be inserted into a vehicle's cigar/cigarette lighter socket, comprising:

means for receiving an external power supply, and means for modifying a characteristic of the external power supply so as to impart an identification signal to said power supply allowing said identification signal to be received and read to enable the vehicle to be driven.

23. A security switching device for a vehicle having an electrical power supply system, said security switching device having a high input impedance and comprising:

a switch arrangement for selectively providing power from the power supply system to a vehicle component which enables the vehicle to be driven;

a vehicle cigar/cigarette lighter adapter coupled to said switch arrangement;

means for receiving, via said vehicle cigar/cigarette lighter adapter, a security signal superimposed on said electrical power supply system; and means for actuating the switch arrangement depending on whether the security signal is valid.

* * * * *